US011586815B2

(12) United States Patent
Olshanetsky et al.

(10) Patent No.: US 11,586,815 B2
(45) Date of Patent: Feb. 21, 2023

(54) METHOD, SYSTEM AND COMPUTER PROGRAM PRODUCT FOR GENERATING ARTIFICIAL DOCUMENTS

(71) Applicant: Proov Systems Ltd, Herzliya (IL)

(72) Inventors: Toby Olshanetsky, Herzliya (IL); Alexey Sapozhnikov, Ramat Gan (IL); Israel Ben Tal, Petah Tikva (IL); Yury Kupitman, Ganei Tiqwa (IL)

(73) Assignee: PROOV SYSTEMS LTD., Herzliya (IL)

( * ) Notice: Subject to any disclaimer, the term of this patent is extended or adjusted under 35 U.S.C. 154(b) by 494 days.

(21) Appl. No.: 16/816,387

(22) Filed: Mar. 12, 2020

(65) Prior Publication Data

US 2020/0293714 A1    Sep. 17, 2020

Related U.S. Application Data

(60) Provisional application No. 62/818,185, filed on Mar. 14, 2019.

(51) Int. Cl.
*G06F 40/253* (2020.01)
*G06F 16/93* (2019.01)
(Continued)

(52) U.S. Cl.
CPC ........ *G06F 40/253* (2020.01); *G06F 11/3688* (2013.01); *G06F 16/93* (2019.01);
(Continued)

(58) Field of Classification Search
CPC .. G06F 40/253; G06F 11/3688; G06F 40/186; G06F 40/30; G06F 40/89
See application file for complete search history.

(56) References Cited

U.S. PATENT DOCUMENTS 5,644,694 A    7/1997 Appleton
5,729,669 A    3/1998 Appleton
(Continued)

FOREIGN PATENT DOCUMENTS

WO    2008/134453 A1    11/2008

OTHER PUBLICATIONS

"Application Layer Intrustion Dectection", available online at https://www.owasp.org/index.php/ApplicationLayerIntrustionDetection, downloaded Sep. 7, 2015.
(Continued)

*Primary Examiner* — Kevin Ky
(74) *Attorney, Agent, or Firm* — Browdy and Neimark, PLLC

(57) ABSTRACT

An artificial document generation method generating a larger set of artificial documents which mimics a smaller set of source documents. The method may include deriving metadata parameters from source documents, each parameter characterizing the source documents and having more than one possible value. The deriving may include: determining which ratio of the source documents has each of the values, defining metadata ratios characteristic of the source documents; training a model, on the source documents, to output artificial documents; and running the model as trained thereby to output artificial documents and overriding at least some words generated by the model in the draft artificial documents. Overriding is configured to ensure that at least some of the ratios characteristic of the smaller set of source documents are retained in the larger set.

25 Claims, 3 Drawing Sheets

1010. set-up. In anticipation of receipt of source documents from enterprise/s pertaining to a given area of interest (e.g. medical, financial). generate knowledge (e.g. functions, n-grams) regarding that area of interest, including generating dictionaries.

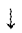

1020. receive D (say, D = 250) source documents from end-user e.g. enterprise..

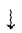

1030. extraction phase: generate metadata characterizing source documents e.g. functions and/or n-grams and/or bag of words and/or template format

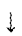

1070. generate model which may be implemented as a neural network such as a recurrent neural network

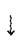

1080. Artificial document generation phase, generating documents which mimic the source documents

(51) Int. Cl.
G06F 11/36 (2006.01)
G06F 40/186 (2020.01)
G06F 40/30 (2020.01)
G06F 40/289 (2020.01)
G06N 3/08 (2023.01)
G06N 3/04 (2023.01)

(52) U.S. Cl.
CPC .......... *G06F 40/186* (2020.01); *G06F 40/289* (2020.01); *G06F 40/30* (2020.01); *G06N 3/08* (2013.01); *G06N 3/0445* (2013.01)

(56) References Cited

U.S. PATENT DOCUMENTS

| | | | |
|---|---|---|---|
| 7,509,626 | B1 | 3/2009 | Barnes et al. |
| 7,620,933 | B1 | 11/2009 | Appleton |
| 8,694,953 | B2 | 4/2014 | Khodabandehloo et al. |
| 9,329,915 | B1 | 5/2016 | Chandrasekharapuram et al. |
| 10,013,467 | B1 * | 7/2018 | Brogle .................... G06F 16/93 |
| 10,140,206 | B2 | 11/2018 | Sapozhnikov et al. |
| 10,348,578 | B2 | 7/2019 | Sapozhnikov et al. |
| 11,158,012 | B1 * | 10/2021 | Rajpara ................. G06Q 50/18 |
| 11,275,794 | B1 * | 3/2022 | Rajpara ................ G06F 40/279 |
| 2004/0111428 | A1 | 6/2004 | Rajan et al. |
| 2006/0288268 | A1 * | 12/2006 | Srinivasan .............. G06F 16/86 715/210 |
| 2010/0274800 | A1 | 10/2010 | Bogeby et al. |
| 2013/0288736 | A1 | 10/2013 | Laumen et al. |
| 2014/0365198 | A1 | 12/2014 | Kuell et al. |
| 2017/0139816 | A1 | 5/2017 | Sapozhnkov et al. |
| 2018/0053134 | A1 | 2/2018 | Olshanetsky et al. |
| 2018/0268313 | A1 * | 9/2018 | Baxter ............... G06Q 10/0635 |
| 2019/0050321 | A1 | 2/2019 | Sapozhnikov et al. |
| 2019/0114251 | A1 | 4/2019 | Sapozhnikov et al. |
| 2020/0034429 | A1 * | 1/2020 | Shukla ..................... G06N 3/08 |
| 2020/0293714 | A1 * | 9/2020 | Olshanetsky ....... G06F 11/3696 |
| 2022/0272539 | A1 * | 8/2022 | Da Silva ............... H04W 48/12 |
| 2022/0301657 | A1 * | 9/2022 | Parnaby ................... G06N 3/04 |

OTHER PUBLICATIONS

"Apache Commons Math" available online at http://commons.apache.org/proper/commons-math/userguide/stat.html, downloaded Oct. 29, 2015.
"Apache Drill", available online at https://drill.apache.org/, downloaded Oct. 23, 2015.
"Sparkling Water provides H2) funcitionality inside Spark cluster" available online at https://github.com/h2oai/sparkling-water.git, downloaded Aug. 10, 2015.
"Apache Flink", available online at https://en.wikipedia.org/w/index.php?title=Apache_Flink&oldid=685853621, Oct. 15, 2015.
"MapReduce", available online at https://en.wikipedia.org/w/index.php?title=MapReduce&oldid=687813284, Oct. 25, 2015.
PCAP definition on Wikipedia (Mar. 2018): available online at https://en.wikipedia.org/w/index.php?title=Pcap&oldid=830802604.
What is PCAP? (Apr. 2018): available online at https://web.archive.org/web/20180415041237/http://www.tech-faq.com/pcap.html.
How to Monitor Machine Learning Models in Real-Time (Jan. 2019): available online at https://www.kdnuggets.com/2019/01/monitor-machine-learning-real-time.htML.
6 Supervised machine learning models on the given dataset (Oct. 2017): available online at https://www.kaggle.com/nirajvermafcb/comparing-various-ml-models-roc-curve-comparison.
Metrics to Evaluate Machine Learning Algorithms in Python (Aug. 2018): available online at https://web.archive.org/web/20180826095232/https://machinelearningmastery.com/metrics-evaluate-machine-learning-algorithms-python/.
Methods for saving and loading Keras Deep Learning Models (Jul. 2017): available online at https://web.archive.org/web/20170711040859/https://machinelearningmastery.com/save-load-keras-deep-learning-models/.
Training, validation, and test sets definition on Wikipedia (Dec. 2018): available online at https://en.wikipedia.org/w/index.php?title=Training,_validation,_and_test_sets&oldid=875589895.
Choosing the right estimator (Dec. 2018): available online at https://web.archive.org/web/20181231235826/https://scikit-learn.org/stable/tutorial/machine_learning_map/index.html.
Examples to available datasets websites: Data catalog (Apr. 2018): available online at https://web.archive.org/web/20180428055928/https://catalog.data.gov/dataset.
NYC open data (Jul. 2018): available online at https://web.archive.org/web/20180730220430/https://opendata.cityofnewyork.us/data/.
Kaggle datasets (Jul. 2018): available online at https://web.archive.org/web/20180730023626/http://www.kaggle.com/datasets.
A part of an example Python code snippet, operative to measure ROC AUC (Nov. 2018): available online at https://web.archive.org/web/20181130112834/https://raw.githubusercontent.com/jbrownlee/Datasets/master/pima-indians-diabetes.data.csv.
Song, Y., Zhang, L., & Giles, C. L. (2011). Automatic tag recommendation algorithms for social recommender systems. ACM Transactions on the Web (TWEB), 5(1), 4.
"N-gram", available online at https://en.wikipedia.org/wiki/N-gram, Mar. 1, 2020.
"Textgenrnn", available online at https://github.com/minimaxir/textgenrnn.
"Beginners guide to text generation using LSTMs" available online at https://www.kaggle.com/shivamb/beginners-guide-to-text-generation-using-lstms, 2019.
Available online at https://cs.stanford.edu/~zxie/textgen.pdf, Mar. 22, 2018: Xie, Z. (2017). Neural text generation: A practical guide. arXiv preprint arXiv: 1711.09534.
Available online at https://www.ijstr.org/final-print/mar2017/A-Review-Of-Synthetic-Data-Generation-Methods-For-Privacy-Preserving-Data-Publishing.pdf.|—Mar. 3, 2017: Surendra, H., & Mohan, H. S. (2017). A review of synthetic data generation methods for privacy preserving data publishing. Int J Sci Technol Res, 6(3), 95-101.
Available online at https://www.aclweb.org/anthology/P18-1194/, Jul. 2018: Luo, B., Feng, Y., Wang, Z., Huang, S., Yan, R., & Zhao, D. (2018). Marrying up regular expressions with neural networks: A case study for spoken language understanding. arXiv preprint arXiv:1805.05588.
"Bag of Words", available online at https://en.wikipedia.org/wiki/Bag-of-words_model, Feb. 26, 2020.
"Machine Learning", available online at https://opennlp.apache.org/docs/1.9.1/manual/opennlp.html#opennlp.ml.maxent.
"Apache POI", available online at https://poi.apache.org/, Feb. 2020.
"Analyzing Sentence Structure", available online at https://www.nltk.org/book/ch08.html, Sep. 4, 2019.
"Sentence Detector", available online at https://opennlp.apache.org/docs/1.9.2/manual/opennlp.html#tools.sentdetect.
"English Tree Tagger . . . ", available online at https://www.sketchengine.eu/english-treetagger-pipeline-2/.
"KDnuggets", available online at https://www.kdnuggets.com/2015/01/text-analysis-101-document-classification.html, Jan. 2015.
"Proov", available online at https://proov.io, downloaded on Aug. 6, 2020.

* cited by examiner

FIG. 1

1010. set-up. In anticipation of receipt of source documents from enterprise/s pertaining to a given area of interest (e.g. medical, financial), generate knowledge (e.g. functions, n-grams) regarding that area of interest, including generating dictionaries.

↓

1020. receive D (say, D = 250) source documents from end-user e.g. enterprise..

↓

1030. extraction phase: generate metadata characterizing source documents e.g. functions and/or n-grams and/or bag of words and/or template format

↓

1070. generate model which may be implemented as a neural network such as a recurrent neural network

↓

1080. Artificial document generation phase, generating documents which mimic the source documents

FIG. 2 operation 1031. Scan source documents to identify n-grams mark the logical position of the identified n-gram in the document (e.g. in which paragraph/s does this n-gram occur)

↓ operation 1032. Scan source documents to identify functions. Typically, the source documents are scanned to identify predefined "functions"

↓ operation 1050. Scan source documents to generate a histogram of all words occurring therein

FIG. 3 operation 1070a. Create bag of words typically including a histogram of all unique words from the source documents.

↓ operation 1070b. Enrich the source documents with synonyms (e.g. natural language synonyms such as big vs. large, synonyms within the area of interest e.g. flue vs. grippe; plural commercial names for the same medication; a suitable database such as WordNet may be used to accumulate synonyms)

↓ operation 1070c. Create numeric representation of (typically enriched) source documents by replacing each unique word by a number or symbbol.

↓ operation 1070d. Train recurrent neural network aka RNN on (c), thereby to obtain a model with an (imperfect) ability to generate sentences similar to those occurring in the source documents.

FIG. 4

Operation 1831. determine, e.g. randomly, while keeping ratios between topics and/or templates identified in corpus of source documents, which topic and/or template the next artificially generated document should belong to,

↓ operation 1851. Use model generated in operation 1070.d, to generate the document by proposing one word at a time.

↓

Operation 1861. For each word proposed by the model, check whether to override the word e.g. by applying relevant n-gram, function or sentence structur rules.

↓

Operation 1871: determine whether to terminate the current sentence, paragraph or section e.g. by applying any suitable stop-criterion.

↓

Operation 1881: formatting of the artificial document in accordance with its template

METHOD, SYSTEM AND COMPUTER PROGRAM PRODUCT FOR GENERATING ARTIFICIAL DOCUMENTS

REFERENCE TO CO-PENDING APPLICATIONS

Priority is claimed from U.S. provisional application No. 62/818,185 "A method, system and computer program product for improved deep mirroring", filed on 14 Mar. 2019, the disclosure of which is hereby incorporated by reference.

FIELD OF THIS DISCLOSURE

The present invention relates generally to software, and more particularly to artificial data generation.

BACKGROUND FOR THIS DISCLOSURE n-grams are a known term, e.g. en.wikipedia.org/wiki/N-gram.

Artificial text generation is known, and is described e.g. in the following websites:
github.com/minimaxir/textgenrnn
www.kaggle.com/shivamb/beginners-guide-to-text-generation-using-lstms
cs.stanford.edu/~zxie/textgen.pdf Tools and platforms which handle synthetic data generation include BizDataX, CA Technologies Datamaker, Deep Vision Data by Kinetic Vision, Delphix Test Data Management, Genrocket, Informatica Test Data Management Tool, Neuromation, Solix EDMS, Supervisely, TwentyBN, and DataGenerator.

A review of synthetic data generation methods is here:
www.ijstr.org/final-print/mar2017/A-Review-Of-Synthetic-Data-Generation-Methods-For-Privacy-Preserving-Data-Publishing.pdf.

The following U.S. Pat. No. 10,348,578 (or US 2019/0280947) patent is co-owned and describes simulation of Production Behavior and/or Data; any operations therein may be combined with methods or operations herein.

Academic articles (e.g. www.aclweb.org/anthology/P18-1194/) are known which explore the question of, "Can we combine a neural network (NN) with regular expressions (RE) to improve supervised learning for NLP?".

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

Certain embodiments seek to generate a large population of artificial documents which mimic a small population of source documents, where the source documents typically pertain to a given area or category of interest.

Certain embodiments seek to define functions, typically based on documents other than the source documents provided by an end-user e.g. enterprise, then try to apply these functions to each word of a draft artificial document being generated by a model e.g. rnn, including examining a 100-word-long window of words extending backward from the current word.

Typically, prior to providing automatic document generation services in a specific area (finance, medical, etc.), a special set of dictionaries, n-grams and functions may be organized. Dictionaries contain the set of words and phrases for the corresponding area. The data is stored in the form of tables in RDBMS. Functions are the special set of data rules, that represent dependencies between various terms, for example several symptoms can lead to a conclusion regarding the specific disease for a patient, disease can point to specific medications used to treat this disease, etc. The "functions" may also comprise or use tables stored in RDBMS. During the generation phase, and in order to improve the performance, these tables are loaded into server RAM.

The system herein may treat or handle or support or accept documents of various types or various file formats (for example, file formats such as: MS WORD, PDF, OpenOffice) as source data in the extraction phase. This may result in metadata e.g. as described herein. This metadata may be used to generate mimicked documents during a generation phase.

Typically, The documents, as a source data, are analyzed, typically first, in terms of its internal structure (aka template). Every identified document templates are treated henceforth as tabled data. More generally, the system herein typically organizes all source data as tables, e.g. every paragraph may be represented as a column in a table. The above-mentioned metadata typically contains information about the types of data e.g. for documents.

Metadata may contain information such as styling of the document, fonts used in this document, type of text in paragraphs like financial, medical, technological, etc.

Typically, the set of source documents can contain documents from multiple templates. Standard processes (e.g. column type identification, text categorization, etc.) defined in an extraction phase are typically applied to the source documents in exactly the same way as for the rest of source data supported by the system herein. During the extraction phase, a Bag-Of-Words (BoW) (en.wikipedia.org/wiki/Bag-of-words_model) may be constructed from all the source documents. This BoW is also a part of metadata. Metadata is also typically augmented with the information of possible logical positions of predefined n-grams in documents, as well as functions. Metadata may contain information such as styling of the document, fonts used in this document, type of text in paragraphs.

The set of source documents may include documents having multiple templates. Standard processes (e.g. column type identification, text categorization, etc.) may be defined in the extraction phase, then typically applied to the source documents e.g. in exactly the same way as for the rest of source data supported by the system herein. During the extraction phase, the Bag-Of-Words may be constructed from all the source documents. This BoW is also a part of metadata. Metadata is also typically augmented with the information of possible logical positions of predefined n-grams in documents, as well as "functions".

Typically, during the generation phase, and in order to improve performance, these tables may be loaded into server RAM. The system herein is typically able to support documents of various file formats (for example, file formats such as: MS WORD, PDF, OpenOffice) as a source data in the extraction phase. This may result in metadata e.g. as described above.

This metadata may be used to generate mimicked documents during the generation phase.

Typically, the documents, as a source data, are analyzed, typically first, in terms of its internal structure (aka template). Every identified document templates is treated henceforth as tabled data, More generally, the system herein typically organizes all source data as tables, e.g. every paragraph may be represented as a column in a table. The above-mentioned metadata typically contains information on the types of data e.g. for documents, metadata may contain information such as styling of the document, fonts used in this document, type of text in paragraphs such as financial, medical, technological, etc. During the generation phase, typically, the raw mimicked data is generated using a model based on metadata from the extraction phase. This model may be a mathematical representation of documents' data and structure. The model may be a mixed NLP and neural net model. Words and sentences generated from the model are constantly checked with the metadata in order to verify whether word/phrase enrichment, "functions", etc. are possible to apply.

For source data which includes documents only, but not texts: typically, once the raw data is mimicked, it is transformed into documents based on the information regarding documents' templates. The information regarding the documents' templates is also stored in metadata.

The present invention typically includes at least the following embodiments:

Embodiment 1

An artificial document generation method generating a larger set of artificial documents which typically mimics a smaller set of source documents, the method comprising all or any subset of the following operations:

deriving plural metadata parameters e.g. from source documents, each of the plural metadata parameters typically characterizing the source documents and having more than one possible value; the deriving typically including determining which ratio of the source documents has each of the values, typically including defining plural metadata ratios characteristic of the source documents;

training a model, e.g. on the source documents, to output artificial documents; and running the model as trained typically including outputting artificial documents aka draft artificial documents, and, typically, overriding at least some words generated by the model in the draft artificial documents, thereby to generate final artificial documents, and wherein the overriding is typically configured to retain at least some of the plural ratios characteristic of the smaller set of source documents in the larger set of final artificial documents.

Embodiment 2

The method according to any of the preceding embodiments and also comprising at least once adding at least one period to a draft artificial document when at least one string of words in the draft artificial document is found to comply to a sentence structure which exists in the source documents.

Embodiment 3

The method according to any of the preceding embodiments wherein the method comprises:

generating a histogram of sentence structures in at least a portion of at least one source document thereby to define ratios R_1, . . . R_S between S different sentence structures found in the at least a portion of the at least one source document; and generating artificial documents mimicking the source documents which include a set of sentences each having a sentence structure, thereby to define a set of sentence structures, and wherein the set of sentence structures includes at least most of the S different sentence structures and is characterized by ratios between the S sentence structures, which respectively approach the ratios R_1, . . . R_S.

Embodiment 4

The method according to any of the preceding embodiments wherein at least some words in the draft artificial document are overridden if the part of speech they belong to does not conform to predetermined grammatical guidelines.

Embodiment 5

The method according to any of the preceding embodiments wherein the grammatical guidelines may be a set of approved sentence structures, where at least one sentence structure includes at least one sequence of parts of speech.

Embodiment 6

The method according to any of the preceding embodiments wherein the ratios retained in the set of final artificial documents includes ratios between the respective proportions of source documents belonging to each of a plurality of document subsets.

Embodiment 7

The method according to any of the preceding embodiments wherein each of the subsets includes a template.

Embodiment 8

The method according to any of the preceding embodiments wherein each of the subsets includes a topic to which content of all documents in the subset pertain.

Embodiment 9

The method according to any of the preceding embodiments wherein each of the subsets includes only documents which conform to a single template and whose content pertains to a single topic.

Embodiment 10

The method according to any of the preceding embodiments wherein the ratios retained in at least a portion of the set of final artificial documents includes ratios between the respective proportions of various sentence structures in at least a corresponding portion of the source documents.

Embodiment 11

The method according to any of the preceding embodiments wherein the ratios between the respective proportions of various sentence structures is retained within specific portions of the source documents.

Embodiment 12

The method according to any of the preceding embodiments wherein the portions comprise paragraphs.

Embodiment 13

The method according to any of the preceding embodiments wherein the ratios retained in the set of final artificial documents includes overriding at least one word W followed by a second word generated by the model in the draft artificial documents, where W plus the second word is not an n-gram, with an n-gram whose first word is W and wherein a ratio of frequency of occurrence of n-grams whose first word is W, in at least a portion of the source documents, is retained in at least a corresponding portion of the set of final artificial documents.

Embodiment 14

The method according to any of the preceding embodiments wherein the portion of source documents comprises only source documents belonging to a certain template, and wherein the portion of the set of final artificial documents comprises only final artificial documents belonging to the template.

Embodiment 15

The method according to any of the preceding embodiments wherein the portion of source documents comprises only certain paragraphs within source documents belonging to a certain template, and wherein the portion of the set of final artificial documents comprises only the certain paragraphs in final artificial documents belonging to the template.

Embodiment 16

The method according to any of the preceding embodiments wherein the model generates the draft artificial documents by proposing one word at a time, and wherein the running comprises analyzing words thus proposed, one word at a time, and overriding a subset of the words thus proposed.

Embodiment 17

The method according to any of the preceding embodiments wherein the overriding comprises applying at least one n-gram, which includes a word W followed by a sequence of at least one more word, and is present in at least one of the source documents, at least once, to at least one individual draft artificial document, including replacing a word w' following an instance of the word W found in the individual draft artificial document, with the sequence.

Embodiment 18

The method according to any of the preceding embodiments wherein the overriding comprises applying at least one function generated in an extraction phase which analyzes the source documents, at least once, to at least one individual draft artificial document.

Embodiment 19

The method according to any of the preceding embodiments wherein some periods in the final artificial documents are contributed by the model and some periods in the final artificial documents are contributed by the overriding which operates on the model's output.

Embodiment 20

The method according to any of the preceding embodiments and also comprising providing software which is configured to accept as input, and process, the source documents, and testing the software on the artificial documents, thereby to cost-effectively provide a larger set of inputs for testing the software than would be available, if only the source documents were to be used as inputs when testing the software.

Embodiment 21

The method according to any of the preceding embodiments wherein the set of approved sentence structure comprises a histogram of approved sentence structures defining ratios therebetween, and wherein the grammatical guidelines include keeping the ratios at least within given margins.

Embodiment 22

The method according to any of the preceding embodiments wherein a bag of words employed to train the model includes:
  words which are instances of at least one category and which occur in the source documents, and also
  words which are instances of the at least one category which do not occur in the source documents.
  For example perhaps the word "influenza" appears in the source documents and is an instance of the category of illnesses.
  According to certain embodiments, a bag of words may be augmented with additional instances of a given category or additional words from this category, which may be taken from dictionaries generated in the set-up phase.
  According to certain embodiments, the system first classifies all documents into text categories, formalized categories may be grouped or clustered e.g. based on template's structures. Once the system has classified text category/ies, the system may use suitable synonyms e.g. may replace certain words, e.g. as randomly generated by an rnn, with synonyms of these words.

Embodiment 23

The method according to any of the preceding embodiments wherein the model comprises a recurrent neural network.

Embodiment 24

A system comprising at least one hardware processor configured to carry out the operations of:
  deriving plural metadata parameters from source documents, each of the plural metadata parameters characterizing the source documents and having more than one possible value; the deriving including determining which ratio of the source documents has each of the values, thereby to define plural metadata ratios characteristic of the source documents;

training a model, on the source documents, to output artificial documents; and miming the model as trained thereby to output artificial documents aka draft artificial documents, and overriding at least some words generated by the model in the draft artificial documents, thereby to generate final artificial documents, and wherein the overriding is configured to ensure that at least some of the plural ratios characteristic of the smaller set of source documents are retained in the larger set of final artificial documents.

Embodiment 25

A computer program product, comprising a non-transitory tangible computer readable medium having computer readable program code embodied therein, the computer readable program code adapted to be executed to implement an artificial document generation method generating a larger set of artificial documents which mimics a smaller set of source documents, the method comprising:

deriving plural metadata parameters from source documents, each of the plural metadata parameters characterizing the source documents and having more than one possible value; the deriving including determining which ratio of the source documents has each of the values, thereby to define plural metadata ratios characteristic of the source documents;

training a model, on the source documents, to output artificial documents; and running the model as trained thereby to output artificial documents aka draft artificial documents and overriding at least some words generated by the model in the draft artificial documents thereby to generate final artificial documents, and wherein the overriding is configured to ensure that at least some of the plural ratios characteristic of the smaller set of source documents are retained in the larger set of final artificial documents.

The invention also includes:

Embodiment 101

A method for synthetic data generation which includes generation of a population of at least one of: text, document/s, and image/s which respectively resemble source population/s of text, document/s, and image/s.

Embodiment 102

A method according to any of the preceding embodiments wherein the method for synthetic data generation generates synthetic text by classifying source text using a Classifier pre-trained on at least one predefined dictionary of terms characteristic of a specific class of text; and generating mimicked or synthetic data from a dictionary specific to each class.

Embodiment 103

A method according to any of the preceding embodiments wherein the method for synthetic data generation generates synthetic documents by defining metadata whose values reflect various document formats characterizing source documents, identifying a template for each format and treating these templates as tabled data.

Embodiment 104

A method according to any of the preceding embodiments wherein the method for synthetic data generation generates synthetic images by receiving source images, identifying shapes therein, and coloring accordingly, where coloring includes grouping the images into groups, detecting at least one object in each group, interpolating a coloring function from same-shape different-color images, and coloring images using the coloring function.

Embodiment 105

A method according to any of the preceding embodiments wherein the method for synthetic data generation generates synthetic images by grouping source images, identifying at least one image in each group and storing metadata accordingly, then using the source images and an additional pre-defined set of images to train a Deep Convolution Generative Adversarial Network yielding a trained model and finally using the trained model to generate a population of mimicked images which mimic the population of source images.

Embodiment 106

A method according to any preceding embodiments wherein the coloring function is estimated using at least one Generative Adversarial Network.

Embodiment 107

A method according to any of the preceding embodiments wherein the synthetic data generation is performed by Proov's Deep Mirroring functionality.

Embodiment 108

Processing circuitry comprising at least one processor and at least one memory and configured to perform at least one of or any combination of the described operations, or to execute any combination of the described modules.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or a combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in the singular form is not intended to be limiting; thus the term processor is intended to include a plurality of processing units which may be distributed or remote, the term server is intended to include plural, typically interconnected modules, running on plural respective servers, and so forth.

The above devices may communicate via any conventional wired or wireless digital communication means, e.g. via a wired or cellular telephone network, or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings; all flowchart illustrations are for methods which may comprise any subset of or all of the illustrated operations, suitably ordered e.g. as shown:

FIG. 1 is a simplified flowchart illustration of an artificial document generation method provided in accordance with certain embodiments.

FIG. 2 is a simplified flowchart illustration of a source document metadata extraction method which may be used to perform extraction operation 1030 of FIG. 1; the method may include all or any subset of the illustrated operations.

FIG. 3 is a simplified flowchart illustration of a model generation method which may be used to perform operation 1070 of FIG. 1; the method may include all or any subset of the illustrated operations.

FIG. 4 is a simplified flowchart illustration of a model output overriding method which typically keeps ratios present in source documents by providing the same ratios in the artificial documents; the method may be used to perform operation 1080 of FIG. 1; the method may include all or any subset of the illustrated operations.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files, which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case some, or all of the variables, parameters and computations described herein, may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include, within the scope of the embodiments of the present invention, also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Deep Mirroring aka DM is intended to include any technology which automatically generates data that "mirrors" e g mimics, patterns and behaviors of an enterprise's real production data. It gives an enterprise all the benefits of running a PoC (proof of concept e.g. on software that an (enterprise) end-user e.g. of the Proov platform seeks to test) with real data to be used as input to that software—such as evaluating how solutions perform in the enterprise's specific production environment—but with none of the risks. Providing even as little as the production data's metadata, the enterprise can easily generate millions of records to populate PoC testing environment/s.

An advantage is that due to privacy, security, or both, enterprises are often prohibited from sharing the data they collect. Yet with Deep Mirroring (DM), data regulations such as the GDPR do not prevent an enterprise from running effective PoCs and thereafter making informed decisions based on PoC results that are relevant because they are specific to the enterprise.

DM is typically executed in all or any subset of the following three phases or operations:

1. Extraction of Metadata from Source Data—Read all Source Data, which May be Provided by an Enterprise.

The enterprise may for example provide partial access to certain documents (e.g. may provide all titles and headings and subheadings of the document, without the content below each title and (sub)heading, or may provide access to an Excel file with column names but without data, or may provide access to raw data only after anonymization.

The system may for example comprise a web service or a cell app, and may allow end-users to upload source data via an interface with a predefined protocol or electronic form.

One should try to identify the source data's internal structure, e.g. all or any subset of the following: relationships between various entities in the source data (e.g. relationships between tables in DB since source data may include tables, each table including columns of data), identifying what every column of data represents (e.g. whether the data in the column represents a social security number or vehicle registration number, etc.). For textual data, the system tries to identify whether this is general text, or a special-domain text e.g. financial or medical texts. All results of the extraction may be stored in a metadata file—e.g. a JSON file representation of all information the system succeeded to identify.

2. Generation—Generating Mimicked Data (e.g. Synthetic Data that Mimics Source Data).

The metadata extracted from the source during the extraction phase is used to train neural networks. The metadata extracted from the source during the extraction phase may also be used to construct interpolation mechanisms, thereafter used to generate synthetic data that mimics source data.

3. Deployment—Synthetic Data Created During Generation is Deployed into a Selected Database that May be a Part of a Proov System Environment.

An example deep mirroring system is described in co-owned U.S. Pat. No. 10,348,578, entitled "Software Proof-of-Concept platform, Including Simulation of Production Behavior and/or Data" (www.freepatentsonline.com/y2019/0114251.html) incorporated herein by reference in its entirety. The system includes a platform configured for communicating with enterprise end-users and for allowing the enterprise end-users to perform proof-of-concept testing for startups which provide respective enterprises with software products to be evaluated by the respective enterprises, the platform including processor functionality configured to analyze available information on enterprise data and, accordingly, generate metadata characterizing the enterprise data; generate artificial enterprise data conforming to the metadata; analyze available information on enterprise APIs and, accordingly, generate metadata characterizing the enterprise APIs; and generate at least one artificial API conforming to that metadata.

The system may be operative in conjunction with a method for communicating with enterprise end-users and for allowing the enterprise end-users to perform proof-of-concept testing for startups which provide respective enterprises with software products to be evaluated by the respective enterprises, the method comprising: providing a platform including processor circuitry configured to: analyze available information on enterprise data in an enterprise's production environment and, accordingly, generate metadata characterizing the enterprise data; automatically generate artificial enterprise data aka "regenerated simulated dataset", conforming to the metadata; analyze available information on enterprise APIs in an enterprise's production environment and, accordingly, generate metadata characterizing the enterprise APIs; automatically generate at least one artificial API aka "regenerated simulated smart API", conforming to that metadata; and providing to at least one enterprise, access via a channel to a pilot environment aka POC testing cloud environment including the regenerated simulated dataset and the regenerated simulated smart API, providing a POC testing cloud environment which is leaner than the enterprise's production environment, but is representative thereof.

Typically, at least one enterprise provides input data from which an enterprise API is regenerated, aka derived.

Typically, the input data has Swagger file format.

Typically, the input data has WSDL file format.

Typically, the input data is provided by granting the platform access to an RDBMS of the enterprise.

Typically, the processor circuitry is configured to analyze the input data and derive API definitions characterizing an API, and, accordingly, to automatically generate server code based at least partly on the API definitions.

Typically, the server code is wrapped in a framework code.

Typically, the method may include generating KPIs for at least one enterprise.

Typically, the method generates a wrapper code that is deployed into a container providing containerized code, using RDBMS credentials and a SELECT command provided to the platform.

Typically, a code operative to compute a KPI value is uploaded into the platform and is wrapped in SQL executing code and deployed into a container providing containerized code.

Typically, the containerized code returns a numeric value which is used as a business KPI including measurement of the business KPI during a pilot run by the enterprise.

Typically, the containerized code returns a numeric value which is used as a variable in a business KPI formula with plural variables, yielding a complex business KPI which is measured during a pilot run by the enterprise.

Typically, the plural variables are provided by plural data sources.

Typically, the plural data sources include at least two of: enterprise (aka customer) API, customer Data source, customer Log files.

Typically, at least one Business KPI is based on automatic learning of enterprise data trends.

Typically, the containerized code returns a numeric value which is used as a business KPI including measurement of the business KPI during a pilot run by the enterprise.

Typically, the containerized code returns a numeric value which is used as a variable in a business KPI formula with plural variables, yielding a complex business KPI which is measured during a pilot run by the enterprise.

Occasionally, source data to be mimicked includes text snippets, (e.g. imaging data that includes numbers and/or text). The text snippet may for example be a WORD document or pdf file.

According to some embodiments, the system allows the end-user to determine or select, e.g. in the extraction phase, what kind of source data to provide to the system e.g. documents, data from relational database, etc. According to some embodiments, the system first classifies Source data as, say, either text snippets, documents, or images (and, perhaps, "other" such as, say, Excel tables) and extraction is then performed differently, depending on the class.

According to some embodiments, the source data comprises a completely unmarked collection of files, where each file may be of various types (e.g. MS-WORD-file or PDF-file, or JPEG or EXCEL).

According to some embodiments, when the source data to be mimicked or mirrored comprises documents, the system asks the end-user to group all the files in a single digital location e.g. directory. According to some embodiments, when the source data to be mimicked or mirrored comprises data rather than documents, the source data may comprise all tables in a designated relational database. In a text generation process, e.g. as described below, such snippets may be mimicked.

Alternatively or in addition, source data uploaded to a system may include real documents (e.g. MS WORD, PDF, OpenOffice documents). The generation phase, in this case, typically includes creating mimicked documents with the same internal structure e.g. template (e.g. for a financial document, the account number should be in the same place and/or should retain appearance (e.g. font size/type) of titles, headings, paragraphs)—and with relevant content, e.g. if the original document contains financial information, the mimicked document should contain financial information as well.

Alternatively or in addition, source data uploaded to a system may include images. In Image generation new images are generated e.g. by coloring original images differently or by construction of new images from the given original images.

Embodiments of text, document and image generation are described in detail below; all or any subset thereof may be used in the generation phase of a deep mirroring system.

Text Generation

During the Extraction phase of Deep Mirroring, source data identified as TEXT [articles, books' excerpt, etc.], passes through a text classifier (aka TC) which is operative to identify a category that each text belongs to, using suitable software e.g. a Maximum Entropy Classifier such as that described in (opennlp.apache.org/docs/1.9.1/manual/opennlp.html#opennlp.ml.maxent).

The text classifier is typically trained to identify a category to which each instance of source data belongs. Training may be on a predefined set of texts organized in categories for example medical texts, financial texts, technology texts, etc. According to some embodiments, a predefined dictionary of terms, that may characterize a specific class of text, is used for classification. For example, medical and financial dictionaries may be maintained by the system, and documents may be classified as medical or financial depending on whether their respective "bags of words" more closely resemble the system's medical dictionary or more closely resemble the system's financial dictionary.

It is possible that a single text may be identified as belonging to two or more different text categories, each such possibility with different probabilities. In such cases, typically the class or text category with the highest probability is selected.

According to certain embodiments, the enterprise's engineer manually keys into a form that all source data for enterprise X is, say, medical or financial, thereby to obviate any need to operate a text classifier.

All this is stored in metadata generated in the extraction phase. Thus the metadata generated in the extraction phase may include a subset of characteristics from the predefined set that contains characteristics such as origin of text (e.g. Wikipedia, Internet, Enterprise X), text subject (like finance, medicine, technology, etc.). Typically, the metadata, once generated, is stored in memory in association with the source data.

During the generation phase and based on metadata gathered from the source data, mimicked data for text source data is typically generated from dictionaries specific for every category from among those categories identified during the extraction phase. Examples of dictionaries are: a dictionary of medical terms, a dictionary of financial terms, a dictionary of streets in US cities organized per state, etc.

Document Generation

The system herein can handle documents in various document formats (for example, document formats such as: MS WORD, PDF, OpenOffice) as a source data in the extraction phase. This may result in metadata e.g. as described above. This metadata may be used to generate mimicked documents during the generation phase. The documents, as a source data, are analyzed, typically first, in terms of its internal structure (aka template). Every identified document template is treated henceforth as tabled data. More generally, the system herein typically organizes all source data as tables, e.g. every paragraph may be represented as a column in a table. The above-mentioned metadata typically contains information on the types of data e.g. for documents, metadata may contain information such as styling of the document, fonts used in this document, type of text in paragraph such as financial, medical, technological, etc. The set of source documents can contain documents from multiple templates. Standard processes (e.g. column type identification, text categorization, etc.) defined in the extraction phase may be applied to the source documents e.g. in exactly the same way as for the rest of source data supported by Deep Mirroring.

During the generation phase, typically, the raw mimicked data is generated based on metadata from the extraction phase, but, after this, raw mimicked data is transformed into documents based on the information regarding documents' templates, and this raw mimicked data is stored in metadata.

Image Generation

Deep Mirroring accepts images as a source data for the extraction phase and can, after that, during the generation phase, produce coloring of source images after identifying shapes in provided images.

Another option is to generate a required number of mimicked images, based on source images.

If coloring of images is required, during the extraction phase, images are grouped based on Single Shot Multibox Detector (SSD) or any other suitable object detection algorithm. For example, the system may have received images of human body limbs as hand and foot and head, etc., perhaps from an end-user in a medical field. Now, all these images may be organized in groups of hands, heads, etc. Then, in every identified group (of objects, each detected entity being an instance of that group), one or more images or a main object of this group is detected e.g. using a YOLO model of object detection. [If more than one limb exists in an image, the system may use the one that is more distinct or a big hand may "win" over a small head]. Images of the same shape (e.g. hand-shape, head-shape, foot-shape etc.), but with different coloring, may be used to interpolate the coloring function. For example, assume that the system has identified 10 images of hands (same shape), now the system seeks to generate 100 more images of hands and to color them with different tints of human body skin. Every tint in source images may be represented mathematically as a tensor of number, and then the system may build a function that interpolates (fill the gaps) between different mathematically represented tints and use, perhaps, tints other than the original tints (e.g. tints that are an interpolation between original tints) in the mimicked data. The grouped images and their coloring may be used further during the generation phase in order to suitably color selected shapes. The actual coloring is done during the generation phase and typically comprises:

Operation i: based on the source image coloring stored in metadata; the required coloring function is estimated e.g. using Generative Adversarial Network.

Operation ii: actual coloring of images is performed, by applying the coloring function estimated in operation i.

If generation of mimicked images is required during the extraction phase, images are grouped e.g. using a Single Shot Multibox Detector, and, after that, object/s e.g. the main object in the image is detected e.g. using the YOLO object detector. The results of the extraction phase are stored in the metadata. Any suitable format may be used for results e.g. [size of source images, image format such as but not limited to JPEG, PNG, identified shapes, etc.]

During the generation phase, based on metadata, the source images, together with a predefined set of images, may be sufficient in quantity to train the neural networks. If the number of source images in a specific category is below a predefined number, this group may be enriched from the predefined set of images. The images are then used to train a Deep Convolution Generative Adversarial Network, thereby to yield a trained model. This trained model is then used to generate mimicked images.

It is appreciated that the above processes of text, document and image generation may be combined. For example, if during document generation, images are identified, image generation may be used to mimic source images from source documents.

The system may, for example, comprise a web service or a cell app, and may allow end-users to upload source data via an interface with a predefined protocol or electronic form.

A method, system and computer program product for generating artificial documents is now described in detail with reference to FIG. 1.

The system may for example be implemented as a self-service SAAS platform.

All or any subset of the following operations, suitably ordered e.g. as follows, may be performed:

Operation 1010. Set-up. In anticipation of receipt of source documents from enterprise/s pertaining to a given area of interest (e.g. medical, financial), generate knowledge (e.g. functions, n-grams) regarding that area of interest, including generating dictionaries.

Set-up is typically done by human engineers who may automate aspects of crawling and/or aspects of analysis.

Setup may include assembling documents from the Internet (e.g. by web crawling) and/or from public databases, which are relevant to the area of interest, and then deriving knowledge (e.g. one or more dictionaries) from these documents, either manually or automatically.

For example, a "glossary" may be found on the Internet, e.g. by a human engineer, which includes terms in an area of interest. A human engineer may write a program for automatic parsing of the glossary including, say, generating a list of the entries in the glossary, since the entries can easily be identified automatically as being in bold and/or a larger font, relative to the text defining the entries.

Dictionaries typically store cross-references between terms used in the relevant area of interest. To support service in a specific area or category (finance, medical, technological, etc.), dictionaries and/or n-grams and/or functions may be provided for each such area. Each dictionary includes words and phrases commonly used for the area, based on an Internet search and/or public datasets, since many end-users in practice prefer that the set-up process does not rely on their own internal data.

Each dictionary may also include relationships between words e.g. which words are synonyms or instances of which. for example, "flu" is an instance of an illness, and "grippe" is a synonym of flu. Dictionaries may include n-grams and/or functions. n-grams may be phrases (sequences of words) or may be sequences of elements other than words e.g. other alphanumeric characters such as symbols or numbers.

Each dictionary may comprise a set of tables e.g. in a RDBMS (Relational Database Management System). n-grams may be stored in tables having (n+1) columns including an id column and n-columns of data.

Functions may include data rules, that represent dependencies or relationships between various terms or words. A function may be stored in table form; each function's record (row) in the table may include an ID, plus various input parameters and output parameters. For example, one function may define that a certain logical combination of plural symptoms can lead to a conclusion that the patient suffering from these symptoms is suffering from a specific disease. Another function may define that a disease can be associated with one or more medications used to treat this disease. Another function may define that 50% of letter recipients have a Gmail suffix in their email address and that 80% of users with Gmail addresses use their name as the prefix of their Gmail address; of these, 20% also add their year of birth. Functions may be stored as RDBMS tables.

Typically the dictionaries list functions found, inter alia. The dictionaries may be stored as one or more relational databases. Each dictionary typically includes plural tables storing functions all pertaining to a given area of interest e.g. medicine. These tables may be stored in a in RDBMS (Relational Database Management System).

Example: a dictionary in the medical field may include various tables including, say, the following table (shown to include but one record, for simplicity) which stores a relationship between Symptoms and Diseases:

| Sympotom1 | Symptom2 | Sympotom3 | Symptom4 | Disease |
|---|---|---|---|---|
| T > 38 | sniffles | cough | N/A | (flu, grippe) |

As well as the following table (shown to include but two records, for simplicity) which stores a relationship between medications and diseases:

Disease-Medication Function

| Disease | Medication1 | Medication2 | Medication3 |
|---|---|---|---|
| Flu | Acamol | Nurofen | Optalgin |
| Migraine | Excedrin | Tylenol | |

Operation 1020. receive D (say, D=250) source documents from end-user e.g. enterprise. It is appreciated that the system herein may be used in conjunction with the Proov proof-of-concept platform, whose end-users include enterprises, or with the systems or methods described in any of applicant's co-owned patents and patent applications, all of which are hereby incorporated herein by reference, ditto.

Operation 1030. extraction phase: generate metadata characterizing source documents. Source document metadata typically includes source document metadata parameters defining all or any subset of:

Functions found in source document/s
n-grams found in source document/s
sentence structure found in source document/s e.g. per subset of source documents such as per template and/or per subject matter
bag of words found in source document/s
template format/s found in source document/s e.g. format characteristics present in documents belonging to this template including but not limited to all or any subset of the following format characteristics: e.g. font types, colors and sizes used per title/subtitle and for text below same, headers/footers, use of italics/bold/underline, etc. Any suitable s/w tool, such as poi.apache.org/, may be used to identify format characteristics of source documents, either in general, or separately, for various subgroups e.g. templates and/or topics.

Templates are an example of a type of sub-set of the source documents. It may be desired to maintain or keep ratios between the proportions of documents belonging to various subsets of the source documents, in the artificially generated documents as well.

Any suitable manual or automatic method may be employed to group source documents into plural templates (or other subgroups). For example, format characteristics present in documents may be identified using any suitable s/w tool, such as poi.apache.org/, and all documents whose output from the s/w tool is identical, or is similar using any suitable similarity metric, may be classified as belonging to a single template.

According to certain embodiments, the set of source documents is categorized or classified or partitioned into various subsets, where all documents within a given subset share a single template. According to certain embodiments, documents which share a single template all include the same number of paragraphs. Typically, a subset of d documents sharing a single, p-paragraph template is represented as a table with d rows and p columns where the p'th paragraph in the d'th document appears in the p'th column of the d'th row.

According to certain embodiments, documents which share a single template are those which have the same hierarchy of titles and sub-titles typically including identity of the titles themselves e.g. all documents within a certain template may have three chapters entitled "background", "detailed description" and "claims".

More generally, a template may be regarded as encompassing a given subset of the larger set of source documents, which differs from other subsets not included in the template on any suitable basis, such as format characteristics.

Extraction may include all or any subset of the following operations e.g. as shown in FIG. 2:

operation 1031. Scan source documents to identify n-grams mark the logical position of the identified n-gram in the document (e.g. in which paragraph/s does this n-gram occur)

Typically, the system stores, for each n-gram, the parts of speech of each word in the n-gram. For example, "heart attack" is a noun-noun 2-gram.

Operation 1032. Scan source documents to identify functions. Typically, the source documents are scanned to identify predefined "functions".

For example, during setup, the system may generate lists of known functions in the relevant category. Then in operation 1032, the system determines whether each known function does or does not occur in the source documents, and, if so, typically, in which paragraph within the source document/s.

Operation 1050. Scan source documents to generate a histogram of all words occurring therein.

According to certain embodiments, the system stores, for each word, the part of speech represented for that word e.g. is this word a noun, verb, etc. This may be part of each bag of words.

According to certain embodiments, learning metadata in the source documents includes learning regular expressions therein. It is appreciated that Regex Generator++ for example, is an online tool which is configured to generate a Regex from examples e.g. source documents provided to the tool, e.g. using a GP search algorithm. According to certain embodiments, the output of the rnn is overridden, depending on rules automatically learned in the extraction phase, by a suitable tool capable of learning regular expressions in source documents. For example, the system may be given 250 source documents which are curriculum vitae, the template thereof being such that the first line of each document is a person's name, and the last name is a person's email address (the email address of the person whose name appears in the first line). The system may use a suitable tool capable of learning regular expressions to discern this, and may then add the email address at the bottom of each artificially generated document, using a function aka functional dependency which states, say, that 80% of email addresses have a gmail.com suffix whereas the remaining 20% have a yahoo.com suffix. Also, 70% of email addresses have a prefix which is identical to the owner's name, and an additional 10% have a prefix comprising the owner's name followed by her or his year of birth. The system may then generate automatic documents which keep these ratios.

Any suitable number of source documents may be provided; references herein to 250 source documents are merely by way of example.

The term "function" or "functional dependency" is used herein to include any rule, which may for example be learned using a regular expression generator, which:

(a) looks back at a window of words extending back from a current word just generated by an rnn in a draft artificial document generated by the rnn (some words of which may already possibly, have been overridden e.g. as described herein); and, accordingly, (b) overrides a current word in the draft (or adds punctuation thereto), e.g. in order to keep, in the artificial documents being generated including this one, ratios identified in source document data.

For example, one possible rule may stipulate that if a man's name or a "Mr." title is used in the 100-word window then if the words "Mrs." Or "Ms." are generated by the rnn (ie appear in the draft artificial document) these should be replaced by "Mr.". This rule would typically be generated when each source document refers to a single individual such that only the title which corresponds to the gender of that individual, is correct.

Some functions or rules may use tables. For example, rules which identify that source documents mention, in paragraph 18, medications for illnesses mentioned in paragraph 16 and, accordingly, override medications mentioned in draft artificial documents with medications, taken from such tables, corresponding to the illness mentioned in paragraph 16 of the same draft artificial document.

Typically, the metadata parameters collected during extraction phase defines source document sentence structure inter alia. Software packages that can identify sentence structure may be used e.g. the software described in:
www.nitk.org/book/ch08.html
opennlp.apache.org/docs/1.9.2/manual/
opennlp.html#tools.sentdetect If, for example, there are 250 source documents, all of a single template which always includes 16 paragraphs, then the system typically generates a histogram indicating more and less common sentence structures for each of the 16 paragraphs.

Thus the histogram of sentence structures for the $15^{th}$ paragraph would summarize the sentence structures occurring in all 250 instances of the $15^{th}$ paragraph in the 250 respective source documents. This histogram might indicate that sentences having a verb-noun structure are twice as common, in the 15th paragraph, as sentences having an adverb, verb, adjective, noun sentence structure.

The set of sentence structures typically includes all, or all but the 10% least frequent, of S different sentence structures found in at least a portion of at least one source document. The set of sentence structures typically includes only sentence structures from among the S sentence structures. The ratios between the S sentence structures in the set of sentences which the artificial documents together comprise, typically either equal the ratios R_1, ... R_S or respectively differ therefrom only slightly e.g. by only 10% or 20% or 30%, at most.

Conventional nlp-processing may be used to derive sentence structure. Here is an example of NLP-processed statement or text:
Original: TERMS AND CONDITIONS FOR USE, REPRODUCTION, AND DISTRIBUTION
Processed, including sentence structure of the original: (TOP (NP (NP (NNP TERMS) (CC AND) (NNS CONDITIONS)) (PP (IN FOR) (NP (DT USE,) (NN REPRODUCTION,) (CC AND) (NN DISTRIBUTION)))))
The above may use a conventional tagset such as that described here: www.sketchengine.eu/english-treetagger-pipeline-2/ to list part-of-speech (POS) labels or tags e.g. np, imp, cc, nns, pp, nn, cc, to indicate the part of speech and/or other grammatical categories (e.g. case, tense) of tokens in a text corpus.

Sentence structures may be nested e.g. noun followed by at least one verb-phrase interconnected by "and", where each verb-phrase includes a verb.

Operation 1070. generate a model which may be implemented as a neural network, such as a recurrent neural network.

The model may more generally comprise an RNN or LSTM or derivative/s thereof which may use sequential processing over time, or a 2D convolutional based neural network with causal convolution, or an attention based model such as the transformer model.

Model generation may include all or any subset of the following operations, suitably ordered e.g. as shown in FIG. 3:

operation 1070a. Create bag of words typically including a histogram of all unique words from the source documents.

According to certain embodiments, the bag of words created in operation 1070a may include words which do not appear in the source documents. Instead, the bag of words also includes counterparts of words found in the source documents. For example, if the source documents include an illness word or several/many such) such as flu, strep throat, breast cancer, the bag of words may also include counterparts which do not appear in the source documents such as, perhaps, tuberculosis or larynx cancer.

According to certain embodiments, each end-user has the option to indicate to the system (e.g. via a suitable webform) whether to include, in the bag of words used to train the rnn, only source documents words, or also counterparts thereof. According to certain embodiments, the system has various dictionaries of, say first names e.g. for males and for females, last names, country names, city names, names of months, and if the former option is used, all names in the bag of words are only those names found in the source documents, whereas if the latter option is used, the bag of words used to train the rnn may include other first names or city names respectively, which do not appear in the source document even once, but are known to the system in its dictionaries.

operation 1070b. Enrich the source documents with synonyms (e.g. natural language synonyms such as big vs. large, synonyms within the area of interest e.g. flu vs. grippe; plural commercial names for the same medication)

Any suitable method and/or database may be used to learn/accumulate synonyms during the extraction phase. For example, a lexical database such as WordNet may be used; for every word an extractor finds in an original text (e.g. a source document), the extractor may scan WordNet for possible synonyms.

Operation 1070c. Create numeric representation of (typically enriched) source documents by replacing each unique word by a number. Typically, the output of this process comprises a sequence of signals. For example, the sentence "give patient Acamol and Optalgin and orange juice" which includes 2 appearances of the word "and", might be encoded as "5 18 71 3 81 3 45 106" if "3" is used as the numeric representation of each occurrence of the word "and'. According to certain embodiments, punctuation marks such as period, comma, @ etc. are not represented as signals. Typically, in this case, all periods and commas in artificial documents are added by the system to the output of the rnn rather than being generated by the rnn. Or, some periods in the final artificial documents may (already be present in the draft generated by the rnn or other model hence may) be contributed by the model and other periods, and may be contributed by a typically rule-based overriding process external to the model e.g. as described herein. operation 1070d. Train recurrent neural network aka RNN on (c), thereby to obtain a model with an (imperfect) ability to generate sentences similar to those occurring in the source documents. It is appreciated that generating a grammatical sentence, e.g. including verb, noun, etc. in proper order is a known NLP task.

A human software developer may, for example, perform all or any subset of the following, suitably ordered e.g. as follows:

Operation a. Create a bag of words aka BoW from the source documents

Operation b. Enrich BoW with synonyms. For example, each word which has known synonyms, may be enriched by a list of all possible synonyms for that word. A special symbol may be used to begin and end the list and the synonyms therein may be separated, say by commas.

Example: "Ibuprofen twice a day" may be replaced by "(Ibuprofen, Advil, Motrin IB) twice a day", or equivalent words (like various names for the same medication). It is appreciated that if, say, 4 synonyms exist which all mean the same, the synonym from among the 4 which eventually appears in the document (if the "word" including 4 synonyms is randomly selected e.g. by the rnn) may be selected randomly, e.g. with equal probability, from among the 4.

Operation c. Create numeric representation of (typically enriched) BoW.

Operation d. Train RNN on (c).

Operation 1080. Artificial document generation phase, generating documents which mimic the source documents. These may include all or any subset of the following operations, suitably ordered e.g. as shown in FIG. 4:

Operation 1831. determine, e.g. randomly, while keeping ratios between topics and/or templates identified in the corpus of source documents, which topic and/or template the next artificially generated document should belong to, such that once a required number of artificial documents is generated, the ratios of artificial documents belonging to each topic and/or template and/or other sub-population, is kept e.g. such ratios respectively resemble the ratios of source documents found, during extraction, to belong to each topic and/or template and/or other sub-population.

Operation 1851. Use model generated in operation 1070.d, to generate the document by proposing one word at a time.

Operation 1861. For each word proposed by the model, check whether to override the word. For example, the system may check all or any subset of:
i. whether to apply one of the n-grams identified during the extraction phase.
ii. whether the logical position in the document in which to apply one of the "functions" has been reached. For example, a function may be stored indicating that, say, the same person's name appears in (say) the first paragraph, first word, in the second paragraph, in the $10^{th}$ paragraph and in the header, for all documents within a given template. The system may then encounter the name Joe Brown in the first word of the first paragraph, and may then override rnn outputs which are names, in the second and tenth paragraphs inter alia, with the same name (Joe Brown).
iii. whether the grammatical structure proposed thus far corresponds to known grammatical structures aka sentence structure (if not, then try to override e.g. by applying existing rules), in any suitable order e.g. in the above order.

Operation 1871: determine whether to terminate the current sentence, paragraph or section e.g. by applying any suitable stop-criterion. For example, a sentence stop-criterion may include whether adequate grammar has already been achieved (for example, if a sentence does not yet include a verb, it should not yet be terminated) and may also take into account how long sentences typically are, in the source documents in general or in a particular logical location e.g. subsection of a document or particular template of document in particular. Determining whether to terminate the current paragraph may occur only if it is determined to terminate the current word, and determining whether to terminate the current section may occur only if it is determined to terminate the current sentence and/or paragraph. Stop criteria for terminating a paragraph may also take into account the metadata parameter of how many sentences the current paragraph in each source document (or source document within the current template) typically has. Ratios may be kept for this metadata parameter. Stop criteria for terminating a section may also take into account the metadata parameter of how many paragraphs the current section in each source document (or source document within the current template) typically has. Ratios may be kept for this metadata parameter.

Operation 1881: as operations 1851, 1871 etc. proceed, the format characteristics of the template of the current document are applied; or this formatting of the artificial document in accordance with its template may occur as a final operation, if the locations of the endpoints of each paragraph and section are kept in memory. For example, the known titles of each section of a document in this template are added, at the proper endpoints e.g. the title for section 2.3 is added just after the endpoint of section 2.2, or, if the final sentence of the fifth paragraph in the final section is known, for the particular template within which the current artificial document is being constructed, to be always in bold. This effect is added, aka applied. It is appreciated that any suitable software tool, such as poi.apache.org/, may be used to identify format characteristics of source documents, either in general or separately, for various subgroups e.g. templates and/or topics.

n-gram application: It is appreciated that when a word is output by an rnn, the system may then check for n-grams, then check for functions, and then check for sentence structure. Or, n-gram and/or function and/or sentence structure checks may be conducted by the system in any other order. It is appreciated that each of these checks may use a different window size, such as 100 words vs 200 words vs 300 words, or all checks performed may all use the same size window, e.g. 100 words.

re n-gram application, the system typically checks each word to determine whether it is the beginning of any of the n-grams identified during the extraction phase. For example, if the word "heart" was generated by the model, the system may find 2 relevant n-grams namely "heart attack" and "heart beat". When the next word appears, the system may override the next word if the next word is not "attack" or "beat". For example, the system may override the next word proposed by the model, if the next word is a noun (same part of speech as attack, beat) but is not "attack" or "beat". The system may decide whether to replace the model-proposed word with "attack" or with "beat", using a "keep ratio" rule such that the ratio between the relative frequency of occurrence of these 2 n-grams in the source documents, as found during extraction phase, is maintained or kept or retained in the artificial documents as well. For example, if "heart attack" was found to be much more common than "heart beat", e.g. in the source documents, the first replacement of "heart" followed by a noun may be to "heart attack", but a suitable proportion of subsequent replacements may be to "heart beat" rather than to "heart attack" (e.g. a proportion of 3:1 in favor of the latter, if the latter was found during extraction to be 3 times as common an n-gram as the former).

Application of Functions to Output of Rnn:

It is appreciated that application of functions to rnn output may depend on the template and/or topic or category to which a given document belongs. Any suitable method may be used to sort or classify n documents into topics, e.g. using keywords, e.g. as described in www.kdnuggets.com/2015/01/text-analysis-101-document-classification.html.

Histogram of words in documents may be compared to dictionaries known to belong to respective topics, to define for each document (for each histogram or bag of words), the best-matching dictionary (and hence the best matching topic) for that bag of words (for that document).

Also, during extraction, the system typically identifies the logical locations of various function entities. For example, the system may find that paragraph 1 (of documents within a certain topic and/or template) often mentions a name, and paragraph 3 of these documents often mentions an email address corresponding to that name (e.g. a Gmail address john.doe@gmail.com, after paragraph 1 mentions the name "john doe". Or, the system may find that (e.g. for a given template and/or topic/category) the document's second paragraph typically mentions various symptoms, the document's fourth paragraph typically mentions an illness corresponding to these symptoms, and the document's $6^{th}$ paragraph typically mentions medications used to treat the illness mentioned in the fourth paragraph.

It is appreciated that a given corpus of documents may include T templates and the set of documents within each template may include t subsets of documents, each pertaining to a different topic. Typically, when generating documents, the ratio between the number of documents in the various templates, and/or the ratio between the number of documents pertaining to each topic, and/or the ratio between the number of documents pertaining to each topic within each template, found in the set of source documents during extraction, is maintained or kept in the artificial documents as well. Typically, enterprises using the system are warned that system success increases, the more source documents are provided for each template-topic combination.

Generally, if a certain ratio, between certain values of a given parameter, characterizes a certain set or population of source documents, and it is desired to retain or maintain or keep or preserve that ratio in a set of artificial documents designed to mimic these source documents, this can be achieved by randomly selecting values for this parameter, when generating the artificial documents, from a universe of values whose distribution is defined by the same ratio. For example, to keep or retain a ratio between the number of source documents in various templates (where, say, 40% of the source documents have template1, 35% of them have template2 and 25% have template3), randomly select the template parameter T of each artificial document from the following distribution: p(T=1)=0.4; p(T=2)=0.35; p(T=3) =0.25; the ratios between the values 1, 2 and 3 which T can assume, will thus be 40:35:25 both in the source document set or population, and in the artificial document set or population. Or, to keep a ratio of 70:30 between the incidence of the n-gram "heart attack" and the incidence of the n-gram "heart beat", in the source documents, the system may operate as follows: at least once, when the rnn selects "heart" as the next word of an artificial document, the word after that, in the artificial document, may be selected from a random distribution in which p(attack)=0.7 and p(beat)=0.3.

Each time an artificial document is generated, typically, the system randomly selects a template and/or topic/category for that artificial document, where the random selection keeps the above ratio. The system then applies functions to some or typically all words generated by the rnn. Typically, the functions are applied in a manner that takes into account the selected template and/or topic/category. For example, the system may have learned that (e.g. for a given template and/or topic/category) the document's second paragraph typically mentions various symptoms, the document's fourth paragraph typically mentions an illness corresponding to these symptoms, and the document's $6^{th}$ paragraph typically mentions medications used to treat the illness mentioned in the fourth paragraph. If this is the case, then if the rnn generates words, for the $2^{nd}$ paragraph, which the system recognizes as symptoms, the system determines the illness corresponding to these symptoms, using the symptom-illness function tables stored from analysis of the source documents. Then, when the rnn generates the fourth paragraph, the system may identify a word generated by the rnn which is an illness. If the illness word is not an illness corresponding to the words recognized as symptoms in the $2^{nd}$ paragraph, the system may override the illness word generated by the rnn and substitute (incorporate into the document now being artificially generated) an illness word which does correspond to the words recognized as symptoms in the $2^{nd}$ paragraph. Generally, the term "override" as used herein, may or may not include replacing the overridden word/s which are removed from the draft artificial document, with substitutes word/s. Alternatively or in addition, when the rnn generates the sixth paragraph, the system may identify a word generated by the rnn which is a medication. If the medication word is not a medication corresponding to the words recognized as symptoms in the $2^{nd}$ paragraph, the system may override the medicine word generated by the rnn and substitute (incorporate into the document now being artificially generated) a medication word which does correspond to the words recognized as symptoms in the $2^{nd}$ paragraph.

The same may be done, mutatis mutandis, if the logical locations, or locations within the source documents, of words which mention various symptoms and/or illnesses and/or medications, is known more exactly e.g. if it is known that the location of the illness word in the fourth paragraph is typically the first word therein, or the $10^{th}$ word therein.

It is appreciated that application of functions to output of rnn is advantageous because while the rnn is recurrent, the rnn typically looks back (e.g. stores states of) only at a short string of previous words in the document, say 2-4 words, since otherwise, operation of the rnn would be impractically slow. In contrast, the system herein may apply functions to a moving window within the artificial document being generated which may be, say 100 words in length, and still achieve an acceptable speed of artificial document generation.

Overriding Based on Sentence Structure:

According to certain embodiments, words in the draft artificial document may be overridden grammatically, if the part of speech they belong to (noun, adverb, number, symbol other than letter/number, etc.) does not conform to predetermined grammatical guidelines. The grammatical guidelines may be a set of approved sentence structures, where at least one sentence structure includes at least one sequence of parts of speech. The set of approved sentence structures may comprise a histogram of approved sentence structures defining ratios therebetween, and the grammatical guidelines may include keeping the ratios at least within given margins.

According to certain embodiments, the extraction phase includes learning certain rules regarding sentence structure, e.g. using online tools for learning regular expressions. According to certain embodiments, rules are generated for identifying sentence structures in draft artificial documents generated by the rnn, which do not appear in the source documents (or appear more frequently in the draft artificial documents than they do in the source documents). If such sentence structures are identified in the document generation phase, the system may include rules for overriding a word in a draft document generated by the rnn, resulting in a sentence structure which does appear in the source documents. For example, if no source document includes any "noun verb adjective" sentence structures, but source documents often include "noun verb adverb" sentence structures, the rule may call for overriding the adjective generated by the rnn in the draft artificial document, with a corresponding adverb, using tables or tools which convert adjectives to corresponding adverbs. For example, "rapid" may be overridden with "rapidly".

Typically, the sequence of words in each final artificial document are the same as the sequence of words in the draft artificial document, except where words in the draft artificial document have been overridden using rules e.g. regular expressions learned in the extraction phase.

It is appreciated that any suitable window size may be used and the reference herein to a window 100 words long, is merely by way of example. The window may, for example, correspond in length to the maximum paragraph length found in source documents, unless the relational database used does not support this length and requires a smaller length.

It is appreciated that, typically, ratios between various source document metadata values are kept by generating the various metadata values randomly, during artificial document generation, where the random generation operates in accordance with a distribution that conforms to the ratios between various source document metadata values. For example, if 70% of email addresses in the source documents have a prefix which is identical to the email owner's name, artificial document generation may include generation of email addresses, in similar locations, 70% of which are randomly selected to have a prefix which is identical to the email owner's name and 30% of which are randomly selected to have a prefix which is not identical to the email owner's name.

According to certain embodiments, the rnn is not informed of overrides or additions of words to its output, and therefore does not learn from same.

According to certain embodiments, ratios are kept for each template. Typically the system may perform all or any subset of the following, in any suitable order e.g. as follows:
(a) decide that a given new document currently being generated is going to be template 2,
(b) apply the fonts etc. that apply to that template; and
(c) when generating the text for, say, paragraph 15 of template2, use the "keep ratio" rule and override words proposed by the model which do not conform to the distribution of sentence structures. For example, if paragraph 15 in the source documents never includes any sentence that begins with an adjective (or includes very few such sentences, and one such sentence has already been included in this paragraph), then if the model proposes an adjective after a period, the system may reject or override the proposed adjective, and instead apply a rule, if any, to replace the adjective with another word.

Typically, the system, when checking a model-proposed word grammatically, looks back at the (assumed currently to be still uncomplete) sentence being generated in the draft artificial document, typically starting from the last period generated (by the system or by the model). If the sentence, assumed currently to be still uncomplete, already has a sentence structure which is present in the source documents, typically in the same paragraph that is currently being generated by the model, typically conforming to the ratio of sentence structures characteristic of that paragraph in the source documents, then the system may add a period thereby to define the current sentence to be complete. If the sentence, assumed currently to be still uncomplete, has a sentence structure which is a portion, but less than the entirety of, a sentence structure present in the source documents, typically in the same paragraph that is currently being generated by the model, typically conforming to the ratio of sentence structures characteristic of that paragraph in the source documents, then the system may decline to override the most recent word and the model is then prompted to provide another word.

According to certain embodiments, the system has various dictionaries of, say first names e.g. for males and for females, last names, country names, city names, names of months, and the system prompts the user (e.g. via a suitable web-form) to select whether all names in the artificially generated documents should be only those names found in the source documents, or whether the system should substitute (e.g. for first names or city names output by the nm) other first names or city names respectively, which may not appear in the source document even once, but are known to the system in its dictionaries, and are randomly selected therefrom.

It is appreciated that a function may be stored indicating that, say, the same person's name appears in (say) the first paragraph, first word, in the second paragraph, in the 10$^{th}$ paragraph and in the header, for all documents within a given template. The system may then encounter the name Joe Brown in the first word of the first paragraph, and may then override rnn outputs which are names, in the second and tenth paragraphs inter alia, with the same name (Joe Brown).

Alternatively or in addition, the system may prompt the enterprise (also termed herein the end-user of the system) to identify a range of years (or any other ordinal variable such as months, days in month etc.) that can be randomly selected from, such that a year or date output by the rnn due to its presence in the source documents, can be overridden by a year or date respectively, which may not appear in the source document even once, but is randomly selected by the system from the user-selected range thereof, and/or from a default system-provided range.

It is appreciated that keeping ratios described anywhere herein may include keeping given ratios within given margins e.g. keeping within 10% or 20% or any predetermined parameter, of the given ratios.

Some source data may include texts rather than documents. Unlike documents, texts typically do not have an internal structure, hence cannot be divided into templates. For example, 10 texts may each comprise a paragraph, or an article with plural paragraphs.

Document Texts do have an internal structure, hence, typically can be divided into templates. For example, a set of 10 documents may include 10 financial documents, 4 of which have a first common template, and the remaining 6 of which may have a second common template. A template may include all or any subset of a title with a format e.g. font type and size that is uniform over all documents having this format, a header and/or footer with a format that is uniform over all documents having this format, a fixed number of paragraphs each of which may have format elements that are uniform over all documents having this format, and so on.

Text Generation may be similar to the document generation method herein, however, operations which assume the existence of templates may be omitted. Typically, operations performed, in document generation, for every field (column within a row) are performed for each text, in text generation. Typically, not just a single field is scanned for "predefined" functions. Instead, the scan is carried out typically over all columns in a given row.

Any operation or method or functionality herein may be used in conjunction with any platform for performing PoCs (proof of concept tests e.g. of software products proposed by software product vendors, typically in collaboration between at least one enterprise end-user of the platform, and at least one ISV (or vendor or startup) end-user of the platform. One example of a proof-of-concept platform or system is the proov.io PoC platform (aka Proov platform or Proov), or any system constructed and operative as described in the proov.io website, or any system described in any of the co-pending patent applications shown and described herein.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment, or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to Optical Fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof, can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Each element e.g. operation described herein may have all of the characteristics described or illustrated herein, or, according to other embodiments, may have any subset of the characteristics described herein.

The terms processor or controller or module or logic, as used herein, are intended to include hardware such as computer microprocessors or hardware processors, which typically have digital memory and processing capacity, such as those available from, say Intel and Advanced Micro Devices (AMD). Any operation or functionality or computation or logic described herein may be implemented entirely or in any part on any suitable circuitry including any such computer microprocessor/s as well as in firmware or in hardware, or any combination thereof.

It is appreciated that elements illustrated in more than one drawing, and/or elements in the written description, may still be combined into a single embodiment, except if otherwise specifically clarified herewithin. It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory and cannot be combined. Any of the systems shown and described herein may be used to implement or may be combined with, any of the operations or methods shown and described herein.

Any operation or characteristic described herein may or may not actually be performed or provided, and the description is intended to include an apparatus, whether hardware, firmware or software which is configured to perform, enable or facilitate that operation or to enable, facilitate or provide that characteristic.

The invention claimed is:

1. An artificial document generation method generating a larger set of artificial documents which mimics a smaller set of source documents, the method comprising:
    deriving plural metadata parameters from source documents, each of the plural metadata parameters characterizing the source documents and having more than one possible value; said deriving including determining which ratio of the source documents has each of said values, thereby to define plural metadata ratios characteristic of the source documents;
    training a model, on the source documents, to output artificial documents; and
    running the model as trained thereby to output draft artificial documents, and overriding at least some words generated by the model in the draft artificial documents, thereby to generate final artificial documents, and wherein said overriding is configured to ensure that at least some of said plural ratios characteristic of the smaller set of source documents are retained in the larger set of final artificial documents.

2. The method according to claim 1 and also comprising at least once adding at least one period to a draft artificial document when at least one string of words in the draft artificial document is found to comply to a sentence structure which exists in the source documents.

3. The method according to claim 1 wherein said method comprises:
    generating a histogram of sentence structures in at least a portion of at least one source document thereby to define ratios $R\_1, \ldots R\_S$ between S different sentence structures found in said at least a portion of said at least one source document; and
    generating artificial documents mimicking said source documents which include a set of sentences each having a sentence structure, thereby to define a set of sentence structures, and wherein said set of sentence structures includes at least most of said S different sentence structures and is characterized by ratios between the S sentence structures, which respectively approach said ratios $R\_1, \ldots R\_S$.

4. The method according to claim 1 wherein at least some words in the draft artificial document are overridden if the part of speech they belong to does not conform to predetermined grammatical guidelines.

5. The method according to claim 4 wherein the grammatical guidelines may be a set of approved sentence structures, where at least one sentence structure includes at least one sequence of parts of speech.

6. The method according to claim 5 wherein the set of approved sentence structure comprises a histogram of approved sentence structures defining ratios therebetween, and wherein the grammatical guidelines include keeping said ratios at least within given margins.

7. The method according to claim 1 wherein said ratios retained in the set of final artificial documents includes ratios between the respective proportions of source documents belonging to each of a plurality of document subsets.

8. The method according to claim 7 wherein each of said subsets includes a template.

9. The method according to claim 7 wherein each of said subsets includes a topic to which content of all documents in the subset pertain.

10. The method according to claim 7 wherein each of said subsets includes only documents which conform to a single template and whose content pertains to a single topic.

11. The method according to claim 1 wherein said ratios retained in at least a portion of the set of final artificial documents includes ratios between the respective proportions of various sentence structures in at least a corresponding portion of said source documents.

12. The method according to claim 11 wherein said ratios between the respective proportions of various sentence structures is retained within specific portions of said source documents.

13. The method according to claim 12 wherein said portions comprise paragraphs.

14. The method according to claim 1 wherein said ratios retained in the set of final artificial documents includes overriding at least one word W followed by a second word generated by the model in the draft artificial documents, where W plus said second word is not an n-gram, with an n-gram whose first word is W and wherein a ratio of frequency of occurrence of n-grams whose first word is W, in at least a portion of the source documents, is retained in at least a corresponding portion of the set of final artificial documents.

15. The method according to claim 14 wherein said portion of source documents comprises only source documents belonging to a certain template, and wherein said portion of the set of final artificial documents comprises only final artificial documents belonging to said template.

16. The method according to claim 15 wherein said portion of source documents comprises only certain paragraphs within source documents belonging to a certain template, and wherein said portion of the set of final artificial documents comprises only said certain paragraphs in final artificial documents belonging to said template.

17. The method according to claim 1 wherein said model generates said draft artificial documents by proposing one word at a time, and wherein said running comprises analyzing words thus proposed, one word at a time, and overriding a subset of said words thus proposed.

18. The method according to claim 1 wherein said overriding comprises applying at least one n-gram, which includes a word W followed by a sequence of at least one more word, and is present in at least one of the source documents, at least once, to at least one individual draft artificial document, including replacing a word w' following an instance of the word W found in said individual draft artificial document, with said sequence.

19. The method according to claim 1 wherein said overriding comprises applying at least one function generated in an extraction phase which analyzes said source documents, at least once, to at least one individual draft artificial document.

20. The method according to claim 1 wherein some periods in the final artificial documents are contributed by the model and some periods in the final artificial documents are contributed by said overriding which operates on the model's output.

21. The method according to claim 1 and also comprising providing software which is configured to accept as input, and process, said source documents, and testing said software on said artificial documents, thereby to cost-effectively provide a larger set of inputs for testing said software than would be available, if only the source documents were to be used as inputs when testing said software.

22. The method according to claim 1 wherein a bag of words employed to train the model includes:
   words which are instances of at least one category and which occur in the source documents, and also
   words which are instances of said at least one category which do not occur in the source documents.

23. The method according to claim 1 wherein said model comprises a recurrent neural network.

24. A system comprising at least one hardware processor configured to carry out the operations of:
   deriving plural metadata parameters from source documents, each of the plural metadata parameters characterizing the source documents and having more than one possible value; said deriving including determining which ratio of the source documents has each of said values, thereby to define plural metadata ratios characteristic of the source documents;
   training a model, on the source documents, to output artificial documents; and
   running the model as trained thereby to output draft artificial documents, and overriding at least some words generated by the model in the draft artificial documents, thereby to generate final artificial documents, and wherein said overriding is configured to ensure that at least some of said plural ratios characteristic of the smaller set of source documents are retained in the larger set of final artificial documents.

25. A computer program product, comprising a non-transitory tangible computer readable medium having computer readable program code embodied therein, said computer readable program code adapted to be executed to implement an artificial document generation method generating a larger set of artificial documents which mimics a smaller set of source documents, the method comprising:
   deriving plural metadata parameters from source documents, each of the plural metadata parameters characterizing the source documents and having more than one possible value; said deriving including determining which ratio of the source documents has each of said values, thereby to define plural metadata ratios characteristic of the source documents;
   training a model, on the source documents, to output artificial documents; and
   running the model as trained thereby to output draft artificial documents and overriding at least some words generated by the model in the draft artificial documents thereby to generate final artificial documents, and wherein said overriding is configured to ensure that at least some of said plural ratios characteristic of the smaller set of source documents are retained in the larger set of final artificial documents.

* * * * *